(12) United States Patent
Chaumel et al.

(10) Patent No.: US 9,428,260 B2
(45) Date of Patent: Aug. 30, 2016

(54) DEVICE AND METHOD FOR MAINTAINING PARALLELISM BETWEEN THE TWO GLAZINGS OF AN AIRCRAFT DOUBLE GLAZING

(75) Inventors: Pascal Chaumel, Plaisance du Touch (FR); Patrick Lieven, Fronton (FR)

(73) Assignee: Airbus Operations S.A.S. (FR)

( * ) Notice: Subject to any disclaimer, the term of this patent is extended or adjusted under 35 U.S.C. 154(b) by 711 days.

(21) Appl. No.: 13/517,349

(22) PCT Filed: Dec. 16, 2010

(86) PCT No.: PCT/FR2010/052761
§ 371 (c)(1),
(2), (4) Date: Sep. 4, 2012

(87) PCT Pub. No.: WO2011/077030
PCT Pub. Date: Jun. 30, 2011

(65) Prior Publication Data
US 2012/0325344 A1 Dec. 27, 2012

(30) Foreign Application Priority Data

Dec. 21, 2009 (FR) ..................................... 09 59280

(51) Int. Cl.
*E06B 7/00* (2006.01)
*B64C 1/14* (2006.01)
*E06B 3/677* (2006.01)

(52) U.S. Cl.
CPC ............. *B64C 1/1492* (2013.01); *E06B 3/677* (2013.01); *Y10T 137/8326* (2015.04)

(58) Field of Classification Search
CPC ... B64C 1/1492; E06B 3/677; E06B 3/6775; Y10T 137/8326

USPC ......................................................... 52/171.3
See application file for complete search history.

(56) References Cited

U.S. PATENT DOCUMENTS 4,886,095 A * 12/1989 Lisec ................................ 141/4
4,979,342 A   12/1990 Holdridge et al.
(Continued)

FOREIGN PATENT DOCUMENTS

DE      19521568 A1   1/1997
EP       0322776 A2   7/1989
(Continued)

OTHER PUBLICATIONS

International Search Report for Application No. PCT/FR2010/052761 dated Mar. 17, 2011.
(Continued)

*Primary Examiner* — Mark Wendell
(74) *Attorney, Agent, or Firm* — Lerner, David, Littenberg, Krumholz & Mentlik, LLP

(57) ABSTRACT

Device intended for a double glazing including at least one outer glazing and one inner glazing separated by an intermediary space filled with a gas, used to isolate an inside environment from an outside environment, a pressure variation being liable to occur between these environments, for example in the case of an aircraft in flight,
includes means for conserving the outer glazing and the inner glazing of this double glazing mainly parallel, independently of this pressure variation.
The invention also concerns a double glazing including this device, the process for maintaining parallelism and software using the process.

13 Claims, 2 Drawing Sheets

(56) References Cited

U.S. PATENT DOCUMENTS

| | | | | |
|---|---|---|---|---|
| 5,735,318 | A | * | 4/1998 | Vianello .......................... 141/67 |
| 5,988,566 | A | | 11/1999 | Meyer |
| 2003/0085238 | A1 | * | 5/2003 | Segro ................................ 222/3 |
| 2007/0188094 | A1 | * | 8/2007 | Tochev et al. ................ 313/552 |
| 2008/0191841 | A1 | | 8/2008 | Fourreau |
| 2011/0061319 | A1 | * | 3/2011 | Anderson et al. ......... 52/204.52 |
| 2011/0133940 | A1 | * | 6/2011 | Margalit ....................... 340/584 |

FOREIGN PATENT DOCUMENTS

| | | |
|---|---|---|
| EP | 0846616 A2 | 6/1998 |
| WO | 2005108729 A1 | 11/2005 |

OTHER PUBLICATIONS

Chinese Office Action for Application No. 201080058362.6 dated Jun. 3, 2014.

* cited by examiner

DEVICE AND METHOD FOR MAINTAINING PARALLELISM BETWEEN THE TWO GLAZINGS OF AN AIRCRAFT DOUBLE GLAZING

CROSS-REFERENCE TO RELATED APPLICATIONS

The present application is a national phase entry under 35 U.S.C. §371 of International Application No. PCT/FR2010/052761, filed Dec. 16, 2010, published in French, which claims priority from French Patent Application No. 0959280 filed Dec. 21, 2009, the entire disclosures of which are hereby incorporated herein by reference.

The present invention relates to the domain of double glazings. It more especially concerns double glazings submitted to high pressure difference between the two environments separated by this double glazing, as is typically the case in aeronautics.

In the aeronautics domain, to allow the pilot to observe the environment outside of the aircraft, the cockpit is equipped with various windows and especially lateral windows for visibility on the sides of the aircraft.

To reduce the sound nuisances generated by the engines, the lateral windows in the cockpit are, generally, for commercial aircraft, equipped with double glazing or even triple glazing.

A double glazing includes two glazings separated by an intermediary space generally filled with a gas. These two glazings generally have very different thicknesses, with a thick outer glazing, itself possibly consisting of several glazings separated by plastic films and a thin inner glazing. These two glazings are flat and parallel when the air pressures on each side of the double glazing and in this intermediary space are identical.

The term parallelism is used here to mean two surfaces equally distant one from the other over their complete span. The surfaces are parallel if each normal to one is normal to the other; the distance between the two glazings, that is between two points, each placed on one of the two surfaces with common normal, is a constant called parallelism distance.

When the aircraft is in flight, the difference in pressure between its outside environment (less than 0.15 bars at 10,000 m) and the environment inside the cockpit (0.75 bars for a typical pressurization equivalent to 1,500 meters in the cabin of the aircraft) is around 0.6 bars.

Possibly combined with the difference in stiffness of the two glazings, this pressure difference causes a deformation of the outer glazing different from the deformation of the inner glazing. The deformation of the outer glazing naturally depends on the difference in pressure between the environment outside of the aircraft and the environment inside the cockpit and can reach up to 7 mm depending on the altitude.

The difference in deformation between the two glazings causes multiple optical diffraction and reflection phenomena when passing the double glazing and therefore hinders the pilot's vision. Thus, for example, a luminous point is transformed into a set of luminous points by the successive reflections on the two glazings which is naturally visually very troublesome.

The target of this invention is to solve this differential deformation problem by proposing a device which allows normal visibility to be conserved through the double glazing when it is submitted to a pressure difference on either side of the said double glazing.

A second target of the invention is to propose a simple and economical device which can possibly be installed on the double glazings of existing aircraft.

For this purpose, the invention first targets a device intended for a double wall including at least one outer wall and one inner wall separated by an intermediary space filled with a gas, the said double wall separating an inside environment from an outside environment, a pressure variation being liable to occur between these environments, the said device including means for conserving the outer wall and the inner wall of this double wall mainly parallel independently of this pressure variation.

The means for conserving the outer wall and the inner wall of the double wall mainly parallel includes:
measuring means including at least the measurement of a distance parameter directly related to the differential deformation between the inner and outer walls,
pressurization means capable of increasing or reducing the pressure in the intermediary space,
control means for the pressurization means according to the parameter or parameters measured and according to a previously stored logic.

It is understood that the curvature of a wall or the walls is modified according to the pressure difference.

Thus, for double glazing, if the inner glazing has, after the implementation of the device, the same deformation as the outer glazing, that is if it is done what is necessary for the two glazings to rebecome mainly parallel, there will no longer be any deformation of the image transmitted through the double glazing. The visibility for the pilot is therefore normal.

In a particular application, the double wall is a double glazing.

To conserve the parallelism between the two glazings, the invention proposes to optimize the pressure in the intermediary space of the double glazing. A pressure variation in the intermediary space of the double glazing modifies the deformation of the outer glazing and even more so creates or modifies a/the deformation of the inner glazing. It is then sufficient to optimize this pressure for the two deformations to become identical and therefore the two glazings to rebecome parallel to each other.

According to a preferred embodiment, the parameters measured consist of the pressure of the outside environment, the pressure of the inside environment and the pressure in the intermediary space.

As the deformation of each of the glazings depends on the pressures on either side of this glazing, the outside environment pressure, inside environment pressure and intermediary space pressure parameters of the double glazing with a logic based on a knowledge of the deformation physics according to the technical characteristics of the double glazing are sufficient to calculate the optimum pressure to be commanded in the intermediary space.

According to a preferred embodiment, the previously stored logic uses a correspondence table stored in a non-volatile electronic memory.

By constructing a deformation graph for each of the two glazings versus the pressures on either side of this glazing, a correspondence table can be created which will give the optimum pressure to be commanded in the intermediary space versus the pressures of the outside and inside environment of the double glazing in order to conserve the parallelism of the two glazings.

According to a preferred embodiment, the device includes means for updating the said correspondence table.

The deformation graph of a glazing can vary according to the aging of this glazing. It is therefore astute to have means for updating the said correspondence table.

According to a preferred embodiment, the previously stored logic includes one or more default commands to be transmitted to the pressurization means to allow for the case where the measured parameters are not present in the correspondence table.

The correspondence table is established taking into account the outside and inside pressure conditions considered during normal flight conditions. It is preferable to foresee the case where the measured parameters fall outside the scope of this correspondence table; this can be due, for example, to a flight condition outside of the normal or to defective measurements by the sensors.

According to a variant, the measured parameter or parameters consist of one or more distance measurements between two points or a set of two points located respectively on each of the two glazings and on a normal common to these two glazings when there is no pressure difference between the inside and the outside.

If the distance between two points is measured on each of the two glazings and these points are chosen as points separated by the parallelism distance under equal pressure conditions therefore when the glazings are parallel and the point corresponding to the outer glazing is chosen in a known deformation area during the deformation process related to the pressure difference, a measurement is obtained which compared with the parallelism distance characterizes the difference in deformation between the two glazings. This measurement can be refined by taking a set of points choosing them preferentially in a substantially equal deformation area of the outer glazing.

In this case, according to a preferred embodiment, the measuring means are optical means or any other distance measuring means between two points.

The means for making this distance measurement are means known by persons skilled in the art; in general, these means are optical triangulation means.

Secondly, the invention targets a double glazing including at least an outer glazing and an inner glazing separated by an intermediary space filled with a gas, the said double glazing separating an inside environment from an outside environment, a pressure variation of a maximum predetermined amplitude being liable to occur between these two environments, wherein it includes a device as described previously.

Indeed, it is possible that the glazings be directly delivered equipped with means for measuring the distance between the glazings, and pressurization means, the control means consisting here of software used in a preexisting aircraft computer.

Under another aspect, the invention also targets a parallelism slave control process between an outer wall and an inner wall of a double wall, separated by an intermediary space filled with a gas under an intermediate pressure, the said double wall separating an outside environment from an inside environment, wherein it includes stages for:
  measuring at least one parameter directly related to the differential deformation between the inner and outer walls,
  calculating a target pressure to be established in the intermediary space,
  maintaining the target whilst the parameter measurement does not indicate a return to parallelism between the walls.

Under yet another aspect, the invention targets a computer program product, intended to be used for a vehicle including at least a double wall including at least an outer wall and an inner wall separated by an intermediary space filled with a gas, used to isolate an inside environment from an outside environment, a pressure variation of maximum predetermined amplitude being liable to occur between these environments, the said computer program product including program code instructions for the execution of the stages of a parallelism slave control process between the outer and inner walls of the double wall, including stages for:
  acquisition of measurements of at least one parameter directly related to the differential deformation between the inner and outer walls,
  calculating a target pressure to be established in the intermediary space,
  maintaining the target whilst the parameter measurement does not indicate a return to parallelism between the walls,
when the said program is executed on a computer or on an onboard system allowing the execution of such a set of software instructions.

In practice, the software will be used by a computer onboard the aircraft for the case of aircraft double glazing.

The features and advantages of the invention will become apparent on reading the following description which makes reference to drawings on which:

Figure 3:
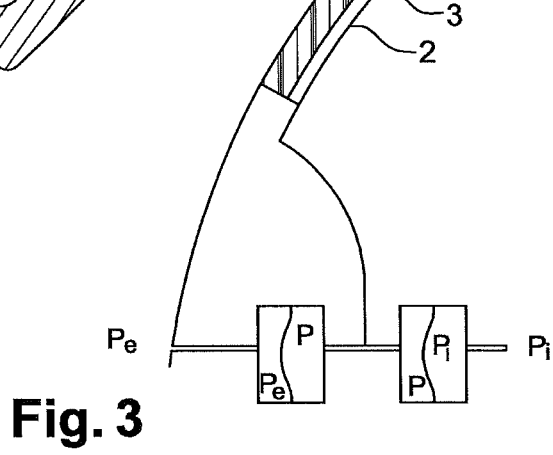

FIG. 3 schematizes a deformation of the outer glazing of the double glazing and the deformation of the inner glazing of the double glazing when the pressure in the intermediary space of the double glazing is optimized in relation to the outside pressure and the inside pressure of the compartment.

Figure 4:
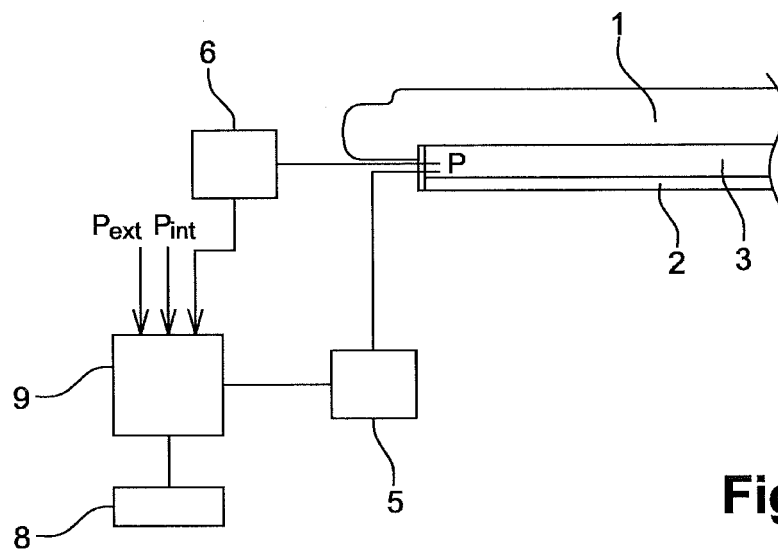

FIG. 4 is a general block diagram of the device according to the invention.

Figure 5:
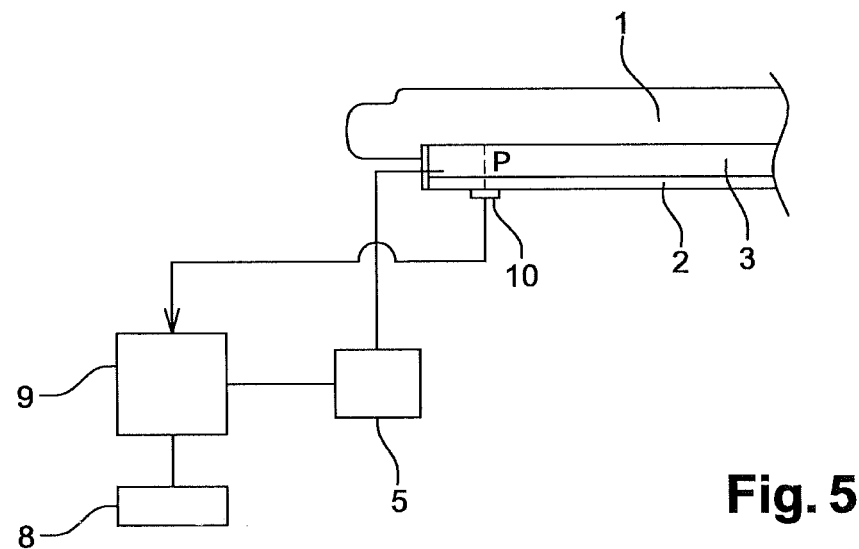

FIG. 5 is a block diagram of an embodiment variant of the device according to the invention.

The invention is intended to be used in a double glazing located in a compartment in an environment where the pressure can be very different from the pressure inside the compartment. In this embodiment example, this compartment is an aircraft cockpit of a type flying at high altitudes and including a pressurized compartment.

Figure 1:
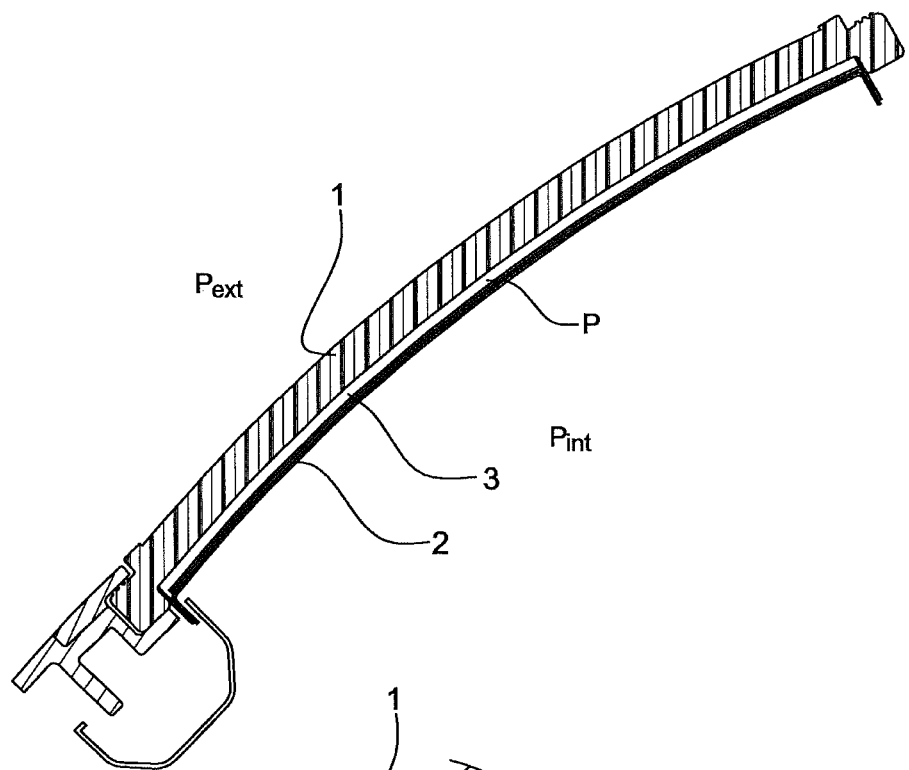
FIG. 1 is a schematic cross-sectional view of a double glazing of aeronautical type.
Figure 2:
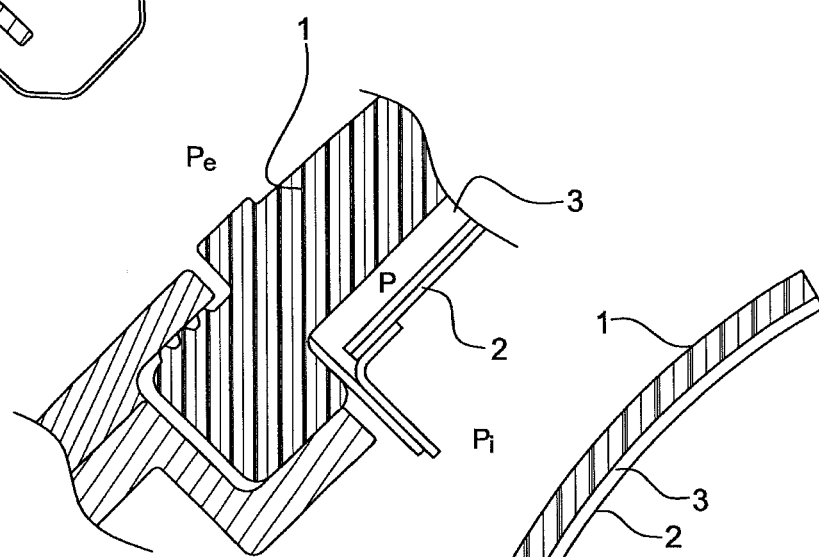
FIG. 2 is a detailed view of FIG. 1.

In a conventional configuration and as represented on the cross-sectional view on FIG. 1 and in more detail on FIG. 2, a double glazing includes at least one outer glazing 1 and one inner glazing 2 allowing the separation of two environments which are the outside of the compartment 4 submitted to a pressure $P_{ext}$ and the inside of the compartment 5 submitted to a pressure P.

The outer glazing 1, which plays a structural role in resisting the pressure difference between the outside and inside environments ($P_{ext}$-$P_{int}$), is generally much thicker than the inner glazing 2, intended simply to provide sound insulation with regard to outside noises.

Each of these two glazings is a transparent panel made of glass, acrylic, polycarbonate or any other known material, and possibly consists of several thicknesses of different materials bonded together.

The double glazing also includes an intermediary space 3 defined as the space between the inner glazing 2 and the outer glazing 1 and delimited on the contour of the double glazing by a seal. This intermediary space 3, normally filled with dry gas or air identical to the air of the compartment, is submitted to an intermediary pressure P.

Conventionally, the outside pressure $P_{ext}$ and inside pressure $P_{int}$ data is used for the control of the aircraft. They are therefore measured by known means and are available for a use in the present invention. The maximum amplitude of the outside pressure $P_{ext}$ and inside pressure $P_{int}$ variations during the flight is assumed to be known; it is determined by the maximum flight altitude and the choice of the pressurization inside the aircraft. According to the stiffness of the outer glazing 1, it is submitted during the gradual drop in the pressure outside of the aircraft to a deformation (bulging), the maximum amplitude of which is also known.

The device according to the invention moreover includes means 6 for measuring the intermediary pressure P existing in the intermediary space 3 between the two glazings. These measuring means 6 are known by a person skilled in the art and include, for example, a digital output pressure gauge and a sensor placed in the intermediary space between the glazings.

The double glazing according to the invention includes means 5 for the pressurization/depressurization of the intermediary space 3, for example consisting of a pump of known type, connected to the intermediary space 3 by a valve passing through the seal. It can act on this intermediary pressure P by increasing it or by reducing it by a value $\Delta p$.

These pressurization/depressurization means 5 are controlled by an electronic device 7 which also receives at input the outside pressure $P_{ext}$ inside pressure $P_{int}$ and intermediate pressure P measurements in real time during the flight.

The said electronic device 7 is in the present non-exhaustive example in the form of a processor 9 and is equipped with a calculation logic, stored in non-volatile memory 8. The elements comprising the electronic device are known themselves and are therefore not detailed here.

In the embodiment described here without limitations, a correspondence table (graph) between the pressure P to be applied in the intermediary space 3 and the outside pressure $P_{ext}$ and inside pressure $P_{int}$ values is previously stored in the non-volatile memory 8.

This graph is initially created either by a theoretical calculation of the deformation of each glazing according to its mechanical stiffness characteristics and the pressure conditions, or by direct measurement of the differential deformation, for example during tests on the ground by submitting a representative double glazing to different pairs of outside and inside pressures and by testing the intermediary pressure which minimizes the said differential deformation.

Concerning its implementation, the double glazing parallelism slave control device is switched on on aircraft startup, simultaneously with the startup of the aircraft pressurization management system on which it depends.

The processor 9 receives the outside pressure $P_{ext}$, inside pressure $P_{int}$ and intermediary pressure P values at recurrent intervals. By reading the correspondence table with as input the nearest pair of pressures ($P_{ext}$, $P_{int}$), the processor 9 determines the target pressure $P_c$ in the intermediary space 3 assumed to ensure a minimum differential deformation between the two glazings. As a variant, the correspondence table can consist of a mathematical function using as input the pair of pressures ($P_{ext}$, $P_{int}$) and giving at output a target pressure $P_c$.

The processor 9 therefore sends to the pressurization/depressurization means 5 a pressurization order if $\Delta p = P_c - P > 0$, and a depressurization order if $\Delta p < 0$. Whilst the difference $\Delta p$ between $P_c$ and P is greater than the previously chosen and stored minimum value, the processor 9 continues to send this target value. The pressurization/depressurization rate is limited by construction of the pressurization/depressurization means to avoid condensation or deformation phenomena which are too brutal on one of the glazings.

The pressure P in the intermediary space 3 therefore gradually reaches the target pressure $P_c$ and the differential deformation is thus minimized reestablishing the parallelism of the glazings and normal visibility for the pilot.

To take into account, for example, the change over time of the mechanical characteristics of the double glazing, or a replacement of double glazing without replacing the parallelism maintaining device, the non-volatile memory 8 can be updated by known means and, for example, by replacing a memory component or by writing into this memory by the processor.

Under normal flight conditions, the pair ($P_{ext}$, $P_{int}$) exists in the correspondence table. However, if this pair is located outside of the correspondence table (case of failure of one of the pressure sensors), the processor chooses for safety reasons a default target value $\Delta p = 0$ which stops the modification of the intermediary pressure.

In the same way, under current flight conditions, the changes of $P_{ext}$, $P_{int}$ and P are gradual at each reading. If this is not the case and, for example, if the variation of the measured value of one of these three parameters is higher than a previously chosen percentage, reflecting probably a failure of one of the sensors, the processor 9 chooses $\Delta p = 0$ by default.

Also, if the intermediary pressure measured does not change during several successive measurements, reflecting a probable defect of the pressurization means 5, the processor 9 also chooses to stop these pressurization means.

The previous description was made with an electronic device dedicated to the invention. It is clear that the pressurization/depressurization means 5 can be controlled by an aircraft computer normally dedicated to other tasks but with available calculation time and memory space. In this case, the additional elements required by the device according to the invention are limited to the means for measuring the intermediary pressure P and means for varying this pressure, both connected to the said computer which must also include outside and inside pressure inputs.

The scope of the present invention is not limited to the details of the embodiment forms considered above as an example but, on the contrary, extends to modifications at the scope of a person skilled in the art.

In a variant, the measurement of the outside, inside and intermediary pressures, the three values of which form a set of parameters directly related to the differential deformation between the inner and outer glazings, are replaced by another differential deformation measurement parameter.

In this case, shown on FIG. 6, the device includes means 10 for measuring the distance between two points (or several groups of two points) placed respectively on the inner and outer glazings, and on a same normal to these glazings in the absence of pressure difference between the inside and the outside, as is for example the case on the ground. As the form of the deformation of the outer glazing can be predicted, one or more points are chosen on the surface of the glazing at locations where this deformation is the highest without for this hindering the pilot's visibility.

The processor 9 then uses this distance measurement (or these distance measurements) as input instead of pressure measurements. The parallelism distance depends on geometrical characteristics of the double glazing and is stored therefore in the non-volatile memory 8 for example when this memory is installed.

The distance measuring means 10 are of known type, for example an optical infrared measurement not described in detail here.

Whilst the surfaces of the glazings are parallel, the distance measured for each pair of points is constant and equal to the parallelism distance between the two surfaces. On the contrary, if one of the glazings is deformed more than the other, the distance varies and characterizes therefore the differential deformation.

In this first implementation, the processor 9 uses the difference between the mean of the distances and the stored parallelism distance to calculate a pressurization target with, as initial rule, that if the distance increases between the glazings, the intermediary pressure must be reduced, and vice versa. The successive measurements over time of this mean distance value and its difference from the parallelism distance which is the target distance, then allows a slave control loop to be created.

The advantage of the optical measurement is that the characteristic parameter of the problem to be solved is measured directly: the differential deformation, and the device can therefore be adapted without modifying the programmed logic to various types of double glazings whereas a correspondence table must be adapted to each type of double glazing (dimensions, thicknesses, attachment method, etc.).

The device can be incorporated into a double glazing before its installation or, on the contrary, be installed on existing double glazing by inserting the pressurization valve through the seal of the double glazing and by connecting the electronic device to the outside and inside pressure measurement cables. The electronic control device can also be replaced by a simple connection to a preexisting aircraft computer on which a software controlling the pressurization means versus data related to the parallelism difference is installed.

In another variant, the device can be adapted to single glazing then including, apart from the elements described previously, an inside glazing 2 to be installed on the inner face of an existing glazing.

It is clear that, in the most frequent case, the aircraft studied includes several windows equipped with double glazings. In a variant allowing means to be saved, a single general electronic device (probably a preexisting aircraft computer) controls the pressurization means of each of the intermediary spaces of the double glazings. Each double glazing however remains equipped with its own differential deformation measuring means to take its own deformation conditions into account.

The device and the process according to the invention apply to all double envelopes separating two environments supporting very different pressures and for which a difference in the deformation of the walls can be harmful. This is the case, for example, of ships transporting fluids or gases under pressure and equipped with a double hull.

Likewise, it is understood that the parallelism constraint can be generalized to any geometrical constraint between the two walls without essential modification of the process.

The invention claimed is:

1. A device comprising:
 a double wall including at least one outer wall and one inner wall separated by an intermediary space filled with a gas, the double wall separating an inside environment from an outside environment, and a pressure variation liable to occur between the inside and the outside environments; and
 means to maintain the outer wall and the inner wall of the double wall substantially parallel independently of the pressure variation,
 wherein the means to maintain the outer wall and the inner wall of the double wall substantially parallel comprises:
  measuring means for measurement of at least one parameter comprising a distance directly related to a differential deformation between the inner and outer walls,
  pressurization means configured for increasing or reducing the pressure in the intermediary space, and
  control means for controlling the pressurization means according to the at least one parameter measured and according to a previously stored logic.

2. The device according to claim 1, wherein the at least one parameter further comprises the pressure of the outside environment, the pressure of the inside environment and the pressure in the intermediary space.

3. The device according to claim 1, wherein the previously stored logic is configured to use a correspondence table stored in a non-volatile electronic memory.

4. The device according to claim 3, further comprising means for updating the correspondence table.

5. The device according to claim 3, wherein the previously stored logic comprises one or more default commands to be transmitted to the pressurization means in case of measured pressures not provided for in the correspondence table.

6. The device according to claim 5, wherein the at least one parameter comprises one or more distance measurements between first and second points or a set of pairs of points, each one located on one of the first and second inner surfaces of the inner and outer walls on a normal common to the walls in the absence of pressure difference.

7. The device according to claim 6, wherein the distance measuring means between the first and second points are optical means.

8. The device of claim 3, wherein the correspondence table comprises predetermined values of the at least one parameter associated with the intermediary space as a function of pairs of values of the at least one parameter associated with the outside environment and the inside environment.

9. The device of claim 1, wherein the control means is configured to receive a first value of the at least one parameter associated with the outside environment beyond the outer wall, a second value of the at least one parameter associated with the inside environment beyond the inner wall, and a third value of the at least one parameter associated with the intermediary space.

10. The device according to claim 9, wherein the first value of the at least one parameter corresponds to the pressure of the outside environment, the second value corresponds to the pressure of the inside environment and the third value corresponds to the pressure in the intermediary space.

11. A double glazing including at least an outer glazing and an inner glazing separated by an intermediary space filled with a gas, the double glazing separating an inside environment from an outside environment, a pressure variation of predetermined maximum amplitude being liable to occur between the inside and outside environments, and comprising a device, the device comprising means to maintain the outer glazing and the inner glazing of the double glazing substantially parallel independently of the pressure variation, wherein the means to maintain the outer glazing and the inner glazing of the double glazing substantially parallel comprises:
measuring means for measurement of at least one parameter comprising a distance directly related to a differential deformation between the inner and outer glazings,
pressurization means configured for increasing or reducing the pressure in the intermediary space, and
control means for controlling the pressurization means according to the at least one parameter measured and according to a previously stored logic.

12. The double-glazing of claim 11, wherein the outer glazing has a first thickness, and the inner glazing has a second thickness smaller than the first thickness.

13. The double-glazing of claim 12, wherein pressurization means is configured for increasing or reducing the pressure in the intermediary space such that a deformation of the inner glazing corresponds to a deformation of the outer glazing.

* * * * *